(12) United States Patent
Scheidig et al.

(10) Patent No.: US 11,371,238 B2
(45) Date of Patent: Jun. 28, 2022

(54) DEVICE FOR DRAINING A LIQUID, AND BUILDING CLADDING ELEMENT COMPRISING SUCH A DEVICE

(71) Applicant: Vector Foiltec GMBH, Bremen (DE)

(72) Inventors: Florian Scheidig, Hamburg (DE); Carl Maywald, Bremen (DE)

(73) Assignee: VECTOR FOILTEC, Bremen (DE)

( * ) Notice: Subject to any disclaimer, the term of this patent is extended or adjusted under 35 U.S.C. 154(b) by 25 days.

(21) Appl. No.: 16/769,712

(22) PCT Filed: Nov. 30, 2018

(86) PCT No.: PCT/EP2018/083203
§ 371 (c)(1),
(2) Date: Aug. 25, 2020

(87) PCT Pub. No.: WO2019/110449
PCT Pub. Date: Jun. 13, 2019

(65) Prior Publication Data
US 2021/0017758 A1 Jan. 21, 2021

(30) Foreign Application Priority Data
Dec. 6, 2017 (DE) .......................... 102017129059.1

(51) Int. Cl.
*E04B 1/70* (2006.01)
*E04D 5/12* (2006.01)
(Continued)

(52) U.S. Cl.
CPC .................. *E04B 1/70* (2013.01); *E04D 5/12* (2013.01); *E04D 13/0404* (2013.01); *E04F 13/005* (2013.01); *F16K 31/084* (2013.01)

(58) Field of Classification Search
CPC ..... E04B 1/70; E04B 7/14; E04D 5/12; E04D 13/0404; E04D 13/005; E04F 13/005;
(Continued)

(56) References Cited

U.S. PATENT DOCUMENTS 4,257,199 A * 3/1981 Kuboyama ............. E04H 15/22
52/2.17
4,452,017 A * 6/1984 Tang ....................... E04H 15/22
264/32
(Continued)

FOREIGN PATENT DOCUMENTS

CN 104631905 5/2015
CN 205024917 11/2015
(Continued)

OTHER PUBLICATIONS

Search Report and Written Opinion from SG Application No. 1 1202005372Q dated May 20, 2021, 8 pages.
(Continued)

*Primary Examiner* — James M Ference
(74) *Attorney, Agent, or Firm* — Mueting Raasch Group

(57) ABSTRACT

A device for draining a liquid from a first film layer which forms at least one part of a building cladding element. A first valve element can be arranged in the region of a first opening of the first film layer such that the valve element can be pivoted between a first position, which closes the first opening, and a second position, which at least partly releases the first opening. Additionally, a first opening and closing are configured to keep the first valve element in the first position if pressure of a liquid is less than or equal to a threshold, allow the first valve element to pivot from the first position to the second position if the pressure of the liquid exceeds the threshold, and pivot the first valve element from
(Continued)

Figure 1:
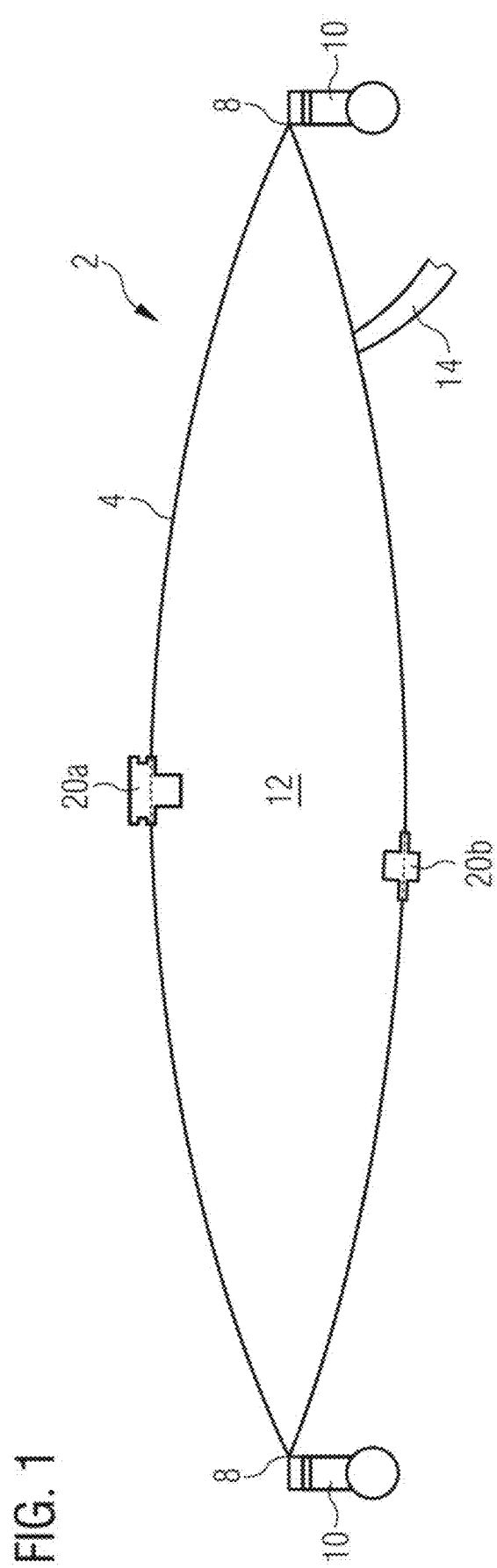

the second position to the first position if the pressure is substantially no longer present.

16 Claims, 7 Drawing Sheets

(51) Int. Cl.
*E04D 13/04* (2006.01)
*E04F 13/00* (2006.01)
*F16K 31/08* (2006.01)

(58) Field of Classification Search
CPC . E04H 15/20; E04H 2015/206; F16K 31/084; F16K 31/088
See application file for complete search history.

(56) References Cited

U.S. PATENT DOCUMENTS

| | | | | |
|---|---|---|---|---|
| 4,807,405 | A * | 2/1989 | Borquist | E04B 1/3211 52/2.18 |
| 4,936,060 | A * | 6/1990 | Gelinas | E04D 13/103 52/1 |
| 6,282,842 | B1 * | 9/2001 | Simens | E04H 15/20 52/1 |
| 6,584,732 | B2 * | 7/2003 | Miller | E04H 15/18 52/2.11 |
| 6,860,069 | B2 * | 3/2005 | Morris | E04H 15/20 52/2.22 |
| 7,415,799 | B2 * | 8/2008 | Morris | E04H 15/20 52/2.11 |
| 7,849,635 | B2 * | 12/2010 | Langner | E04H 15/20 52/2.22 |
| 8,146,296 | B2 * | 4/2012 | Nishikawa | A01G 9/1415 52/2.23 |
| 2004/0074151 | A1 * | 4/2004 | Morris | E04H 15/20 52/2.22 |
| 2007/0267069 | A1 * | 11/2007 | Sarno | F16K 31/563 137/527 |
| 2008/0135187 | A1 * | 6/2008 | Weddell | E04F 10/0666 160/44 |
| 2010/0186306 | A1 * | 7/2010 | Langner | E04H 15/20 52/2.22 |
| 2011/0110076 | A1 * | 5/2011 | Langner | G09F 9/33 362/145 |
| 2014/0007536 | A1 * | 1/2014 | Maywald | E04H 15/20 52/408 |
| 2021/0017758 | A1 * | 1/2021 | Scheidig | E04D 5/12 |

FOREIGN PATENT DOCUMENTS

| | | |
|---|---|---|
| CN | 206015890 | 10/2016 |
| DE | 20219287 | 4/2004 |
| EP | 3246483 | 11/2017 |
| JP | 5924070 | 2/1984 |

OTHER PUBLICATIONS

Chinese Office Action from Chinese Application No. 201880088172.5 dated May 18, 2021, 9 pages.

* cited by examiner

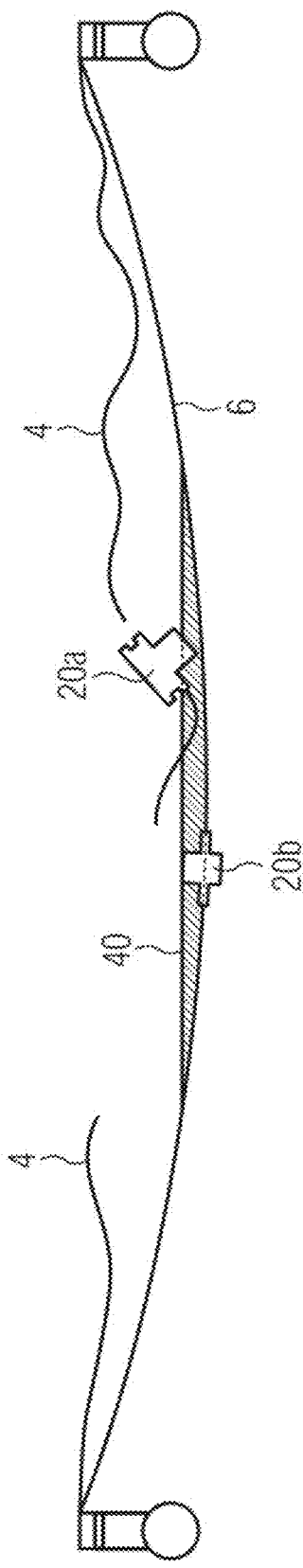
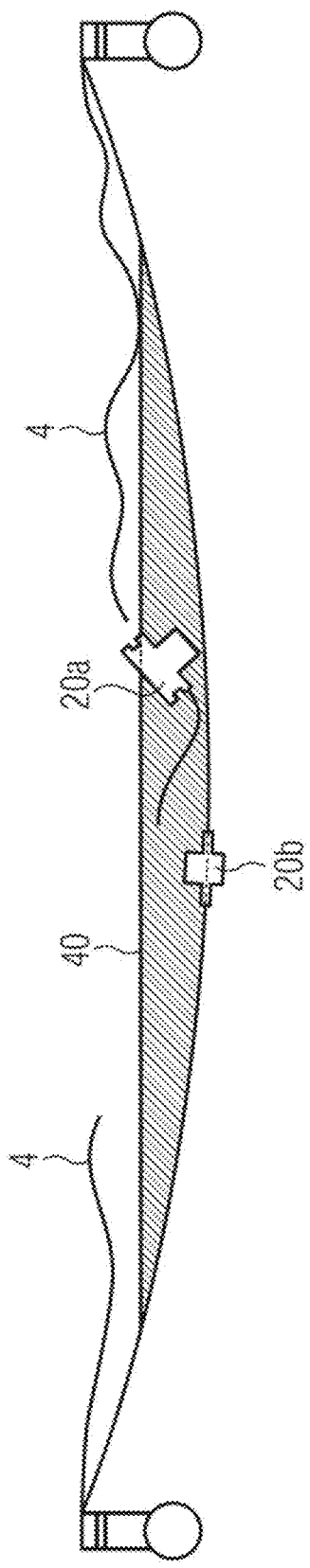

DEVICE FOR DRAINING A LIQUID, AND BUILDING CLADDING ELEMENT COMPRISING SUCH A DEVICE

The invention relates to a device for draining a liquid, in particular rainwater, from a first film layer which forms at least part of a building cladding element. Furthermore, the invention relates to a building cladding element having the first film layer as single film layer. Finally, the invention relates to a building cladding element having a film cushion which has at least a first film layer and a second film layer, wherein at least one substantially fluid-tightly closed cavity is formed between the first film layer and the second film layer and in which a fluid medium, in particular air, is contained, and the fluid medium in the cavity can be charged with a pressure.

Building cladding elements of the aforementioned type are used in film roofing systems and also film façade systems. Application areas which come into consideration are in particular large commercial buildings, such as for example sports stadiums, events centers or shopping centers. The advantages associated with film roofing systems, such as in particular lightness, light permeability, ability to adapt the heat permeability and/or ability to configure the coloring, particularly apply to these large roof areas.

The applicant develops, produces and markets building cladding elements of the aforementioned type. The building cladding elements customarily consist of film cushions or are assembled therefrom, with the film cushions being formed from an arrangement of at least two film layers which are spaced apart from one another in certain portions. The two film layers of the film cushions are welded to one another along their edges or fluid-tightly connected to one another in some other way and form between them at least one substantially fluid-tightly closed cavity. The film cushions are fastened to a structure along the edges of the two film layers. Furthermore, a compressed-air supply device is provided which has, for example, a pipe, a duct and/or a hose and also an external compressed-air source connected thereto in order to introduce the air under pressure into the cavity of the film cushions. The pressure prevailing in the film cushions is of crucial importance for their functionality, in particular for their stability, insulating action and resistance. In principle, it is also conceivable, instead of a film cushion, to use a single-layer film roofing system or film façade system having only a single film layer which is fastened under tension by its edges to the structure.

In the case of an unexpected pressure loss in the film cushions, the upper or outer film layer loses its outwardly and upwardly curved shape and threatens instead to collapse, that is to say to cave in on itself or to slump, with the result that it initially assumes a horizontal orientation and then obtains a downwardly curved 'sagging' shape, whereby it then forms an upwardly or outwardly open depression. The same problem also occurs with a single-layer film roofing system or film façade system if the tension in the single film layer used considerably decreases or even completely disappears. In both cases, the collapsed film layer in question here forms a trough-shaped depression in which rainwater can now collect. With increasing inflow of rainwater, the weight of the water collected on the upper side of the film layer increases, which then, on account of the extensibility of the film layer, causes the trough-shaped depression in the collapsed film layer to increase and to further slump downward until, as a result of the overload caused by the increase of the liquid, the film layer tears or the retaining structure holding the film layer is damaged.

In order to avoid the above-described scenario, there already exist various approaches.

One approach consists in arranging the film layer in an inclined orientation such that the water can correspondingly flow off. However, such an inclined arrangement is not appropriate for each intended use and each structural situation and therefore leads to unnecessary limitations.

A further approach consists in placing the film layer under considerably greater tension than hitherto or to use films having a considerably lower extension behavior. However, it has been found that such measures are also very tightly limited, with the result that reliable drainage of rainwater can also not always be ensured in the above-described scenario.

A further approach consists in using particular monitoring systems by means of which the state of the film layer and/or, in the case of using film cushions, the pressure generation or the pressure drop is monitored, with a corresponding alarm signal being generated in the event of a fault. Apart from the fact that what is concerned here is an indirect measure which, in the event of a fault, entails further direct measures for the actual removal of the rainwater, it is fundamentally not completely possible to rule out the risk that a malfunction or even a complete failure can occur even in such a monitoring system, with the result that a fault is not identified.

Finally, a further approach consists in providing one or more drainage hoses. Apart from the fact that both the assembly and, in particular in the case of film cushions, the routing of such hoses is complicated, there is the risk that the hoses will buckle as a result of the lowering of the collapsed film layer and thus block the further drainage of rainwater.

It is therefore an object of the present invention to propose constructional measures which ensure secure drainage of liquid, in particular rainwater.

This object is achieved by a device for draining a liquid, in particular rainwater, from a first film layer which forms at least part of a building cladding element, characterized by a first valve element which can be arranged in the region of a first opening, which is provided in the first film layer, in such a way that it is pivotable between a first position in which it closes the first opening and a second position in which it at least partially frees the first opening, and first opening and closing means which can be mounted on the first film layer and which are designed to hold the first valve element in the first position as long as the pressure, which acts on the first valve element, of a liquid which has come onto the upper side of the first film layer is less than a predetermined first threshold value or at most equal to this threshold value, to allow a pivoting movement of the first valve element from the first position into the second position if the pressure of the liquid acting on the first valve element exceeds the first threshold value, and to pivot the first valve element from the second position into the first position after the pressure of the liquid acting on the first valve element is substantially no longer present.

The invention ensures, in a constructionally simple, but effective manner, secure drainage of liquid, in particular rainwater, from a film layer, preferably if the latter collapses. This is achieved according to the invention by the use of a valve whose valve element in the normal operating state closes the associated opening in the film layer and has to withstand only loads caused by gusty winds and, in the case of a film cushion, also the cushion internal pressure. Furthermore, the valve element and the opening and closing means are designed according to the invention in such a way that the valve can withstand a water column up to a defined height, which forms the aforementioned threshold value, also in the closed state. If the water column exceeds the defined height, the load of the water column causes opening of the valve by the valve element pivoting from the closed first position into the opened second position. The pressure of the liquid acting on the valve element thus leads as it were to an automatic pivoting of the first valve element from the first position into the second position by virtue of the gravitational force acting not only on the valve element itself but also correspondingly on the liquid loading the valve element, with the result that the valve element is pressed downward. On account of the then opened valve, the liquid collected on the upper side of the film layer, in particular in its collapsed state, is reliably drained, with the result that the water column drops. In order to ensure substantially complete drainage of the water, the valve, by pivoting of the operating element actively brought about by the opening and closing means according to the invention, closes from the open second position back into the first closed position according to the invention only if substantially no water column is still present, for which purpose the opening and closing means are correspondingly designed according to the invention in that, for the pivoting-back movement, they have to counteract only the weight of the valve element.

The construction according to the invention offers still further advantages. By virtue of the fact that according to the invention the valve element is to be arranged pivotably, it can be opened in such a way that the opening is then substantially completely exposed; consequently, a relatively high flow rate of the liquid to be drained can be achieved, with the result that the drainage of the liquid from the affected film layer can take place in a relatively short time. Further advantages consist in a considerably increased failure safety, lower manufacturing costs and lower maintenance effort.

The device according to the invention can be realized on a single-layer film roofing system or film façade system in which the first film layer forms the sole film layer. Alternatively, however, the use of the device according to the invention is also possible on a film cushion whose cavity is delimited not only by the first film layer but also by a second film layer. With a film cushion, it can occur in the event of a malfunction that liquid, in particular rainwater, can collect not only on the upper side of the upper film layer but, additionally or instead, also on the upper side of the lower film layer. This is particularly the case if the upper film layer collapses and as a result the valve in the upper film layer opens in order to drain the liquid. This liquid then passes onto the upper side of the lower film layer. In order to drain this liquid finally also from the lower film layer, the device according to the invention should preferably also be provided in the lower film layer. Accordingly, in a preferred embodiment suitable for a film cushion, there are to be provided not only a first valve element and first opening and closing means according to the invention on the first film layer, but additionally also a second valve element and second opening and closing means according to the invention on the second film layer. This embodiment thereby ensures complete removal of undesirably collected liquid from the film cushion.

Further preferred embodiments and developments of the invention are defined in dependent claims 3 to 16, with the features specified there referring in principle to the first film layer, the first opening formed therein, the first valve element and/or the first opening and closing means, although, when the device according to the invention is used in a film cushion as claimed in claim 2, they additionally also refer to the second film layer, the second opening formed therein, the second valve element and/or the second opening and closing means (that is to say without in this respect differentiating between "first" and "second").

The valve element is preferably designed as a flexible or elastic tab which can be fastened by its one end to the film layer and is movable by its other end with respect to the opening and, in one development, is produced at least in certain portions from film material, with the result that a particularly simple construction can be realized.

Alternatively, according to a further preferred embodiment, the valve element is designed as a flap which is pivotable by its one end about a hinge, which can be mounted in a substantially positionally fixed manner with respect to the film layer, and is movable by its other end with respect to the opening and, in one development, forms a substantially rigid element. The use of a flap has the advantage that the associated opening in the film layer can be particularly effectively opened and, in the open second position of the valve element, substantially exposes the entire opening cross section of the opening and can be used for quick and thus effective draining of the liquid.

The opening and closing means preferably have restoring means which generate a restoring force in order to pivot the valve element from the second position in the direction of the first position.

In a development of this embodiment, the restoring means have spring means whose spring force forms the restoring force. A development to be realized in a constructionally particularly simple manner when using a flap as valve element consists in the spring means having at least one spiral spring which is arranged in the region of the hinge or on the hinge.

The restoring force generated by the restoring means can be rated in such a way so as to hold the valve element in the first position as long as the pressure of the liquid acting on the valve element is less than the threshold value or at most equal to the threshold value, with the result that, upon exceeding the threshold value, the restoring force is overcome and thus the restoring means yield, whereby the valve element opens and passes into the second position.

A further preferred embodiment of the invention is distinguished by the fact that the opening and closing means have a first magnet element which can be mounted on and/or in the film layer and a second magnet element which is provided on and/or in the valve element, wherein the two magnet elements are designed and oriented with respect to one another in such a way that an attraction force acting on the two magnet elements is generated. This attraction force causes the valve element to pivot into the first position and furthermore ensures that the valve element is held in the first position to close the associated opening in the film layer. In this connection, it should also be noted for proper comprehension that the term "magnet" used in the claims encompasses different embodiments in which, for example, a, preferably platelet-shaped, body or alternatively magnetic or magnetizable material, for example through application or introduction, is used as magnet element.

The attraction force is thus preferably to be rated so as to bring the valve element into the first position and to hold it in the first position if and as long as the pressure of the liquid acting on the valve element is less than the threshold value or at most equal to the threshold value.

Furthermore, the attraction force is preferably to be rated so as to bring the valve element into the first position if the distance between the two magnet elements falls below a predetermined maximum value.

Since, in the second position of the valve element, that is to say in its substantially completely opened position, the liquid has been substantially completely drained, the valve element is no longer charged by a liquid pressure. Accordingly, no liquid pressure then counteracts the valve element from pivoting back from the second position into the first position. Rather, only the weight of the valve element has to be overcome for this pivoting movement. Therefore, in a preferred development of the aforementioned embodiment, the restoring force of the restoring means is to be rated in such a way that it substantially counteracts only the weight of the valve element in order to pivot it from the second position in the direction of the first position. When the valve element approaches the first position, that is to say the closed position, during this pivoting movement, the distance between the two magnet elements thus necessarily also becomes ever smaller. This results in the distance between the two magnet elements falling below the aforementioned predetermined maximum value such that the attraction force between the two magnet elements then begins to act and thus takes over the remainder of the pivoting movement of the valve element into the first position. Consequently, the pivoting-back movement of the valve element from the second position into the first position is initially brought about by the restoring force of the restoring means and then by the attraction force between the two magnet elements. By virtue of this combined application of first of all the restoring force of the restoring means and then of the attraction force of the two magnet elements, the pivoting movement of the valve element from the second position into the first position can be realized in a constructionally particularly simple and at the same time effective manner.

Optionally, (1.) the first magnet valve can have magnetic material and the second magnet element can have magnetizable material, or (2.) the first magnet element can have magnetizable material and the second magnet element can have magnetic material, or (3.) both magnet elements can have magnetic material.

The second magnet element is preferably provided on the valve element in the region of the other end or adjacent to its other end that is situated remotely from the one end or lies opposite to the one end by which the valve element is pivotably fastened to the film layer.

The invention will be explained in more detail below with reference to a preferred exemplary embodiment. In the drawing:

FIG. 1 schematically shows in cross section a film cushion of a building cladding element having in each case a valve according to a preferred embodiment of the invention in both film layers delimiting the film cushion:

FIG. 2 shows, in an enlarged depiction in the form of a detail, a portion of one of the two film layers of the film cushion from FIG. 1 with a schematic illustration of the construction of the valve in a closed first position with water situated on the upper side of the film layer (a), in a substantially completely opened second position (b), in a pivoted position during the pivoting movement from the opened second position into the closed first position (c) and again in the closed first position with the film layer now freed from the water and thus without loading of the film layer with water (d);

FIG. 3 schematically shows in cross section the film cushion from FIG. 1 in a first state (a) in which the upper film layer begins to collapse and water has already formed on the upper film layer, but the two valves are still closed, and in a second state (b) in which the upper film layer has partially collapsed, further water has formed on the upper film layer and now both valves are opened such that water has already passed onto the lower film layer;

FIG. 4 schematically shows in cross section the film cushion in a first state (a) in which the upper film layer has completely collapsed and water has formed on the upper film layer, but the two valves are still closed, and in a second state (b) in which further water has collected on the completely collapsed upper film layer and now both valves are open such that water has passed onto the lower film layer and is drained through the valve in the lower film layer;

FIG. 5 schematically shows in cross section the film cushion in a first state (a) in which the upper film layer has still substantially completely collapsed, only relatively little water is now situated on the upper film layer, both valves are closed again and compressed air begins to be blown into the film cushion, and in a second state (b) in which, in order to straighten up the upper film layer, further compressed air has already been blown into the film cushion and the valves continue to be closed; and FIG. 6 schematically shows in cross section the film cushion in a first state (a) in which the upper film layer is torn, the valve in the upper film layer has thus been rendered ineffective and water has already accumulated on the lower film layer, but the valve in the lower film layer is still closed, and in a second state (b) in which further water has accumulated on the lower film layer and the valve in the lower film layer is now opened in so order to drain the water.

FIG. 1 schematically depicts in cross section a building cladding element in the form of a film cushion 2 which, together with a plurality of further building cladding elements or film cushions, can form a film roofing system or film façade system. In the exemplary embodiment illustrated, the film cushion 2 is delimited by an upper film layer 4 and a lower film layer 6. The film layers 4, 6 are welded to one another along their edges 8 and fastened to a supporting structure 10. Between the two film layers 4, 6 there is formed a substantially fluid-tight cavity 12. The cavity 12 is filled with compressed air, for which purpose, in the illustrated embodiment, a compressed-air supply line 14 communicates with the cavity 12, said line being connected to a compressed-air supply device (not shown) and being routed through the lower film layer 6. Furthermore, an upper first valve 20a is provided in the upper film layer 4, and a lower second valve 20b is provided in the lower film layer 6. The two valves 20a, 20b serve for draining water, which is customarily rainwater, which has collected on the upper side of the respective film layer 4 or 6, which drainage operation will be described in more detail below.

In the exemplary embodiment illustrated, the two valves 20a, 20b have the same design, which is schematically depicted in FIG. 2. As can be seen in FIG. 2, the valves 20a, 20b are each provided on the film layer 4 or 6 in the region of an opening 22 which is formed in the corresponding film layer 4 or 6 and is delimited by opposite edge portions 24a, 24b of the film layer 4 or 6. Furthermore, the valves 20a, 20b each have a valve element 26 which, in the exemplary embodiment illustrated, is designed as a substantially rigid flap and is arranged by its one end 26a on the adjacent edge portion 24a of the film layer 4 or 6 so as to be pivotable by way of a hinge 28, with the result that the valve element 26 is movable with respect to the other edge portion 24b of the film layer 4 or 6 by another end 26b opposite to the one end 26a. Also provided in the region of the hinge 28 is a spring 30 which is preferably designed as a spiral spring and preloads the valve element 26 into a closed first position in which the valve element 26 is illustrated in FIG. 2a. For this purpose, the spring force of the spring 30 is substantially only rated such that it counteracts the intrinsic weight of the valve element 26.

Figure 2A:
Figure 2A:
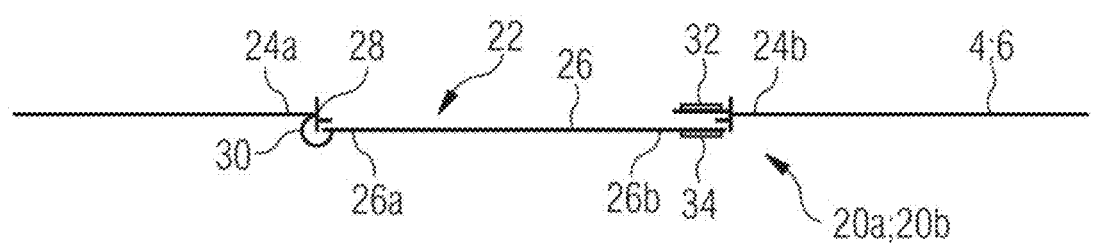

On the other edge portion 24b of the film layer 4 or 6 there is arranged a first magnet 32. In the exemplary embodiment illustrated, the first magnet 32 is designed as a platelet-shaped body which is arranged flat on or on top of the edge portion 24b of the film layer 4 or 6. However, it is alternatively also conceivable to form the first magnet 32 into the edge portion 24b of the film layer 4 or 6 and thus into the film layer 4 or 6 or to provide the edge portion 24b or part of this edge portion 24b with magnetic or magnetizable material, for example by applying or introducing magnetic or magnetizable material. All of these aforementioned embodiments and also further correspondingly suitable, nonspecified embodiments equally fall in the present context under the term "magnet" used here. As countermagnet there is arranged a second magnet 34 on the other end 26b of the valve element 26 that is situated opposite to the one end 26a and the hinge 28, with the result that, in the closed first position of the valve element 26 as illustrated in FIG. 2a, this second magnet 34 is situated adjacent to or even touches the first magnet 32 on the edge portion 24b of the film layer 4 or 6. In the exemplary embodiment illustrated, the second magnet 34 is also, similar to the first magnet 32, formed as a platelet-shaped body consisting of magnetic or magnetizable material. Instead of an arrangement on or on top of the valve element 26, it is for example alternatively also conceivable to form the second magnet 34 into the other end 26b of the valve element or to provide the other end 26b of the valve element 26 with magnetic or magnetizable material, for example by applying or introducing magnetic or magnetizable material. The two magnets 32, 34 preferably have magnetic material; however, it is alternatively also conceivable that the first magnet 32 has magnetic material and the second magnet 34 has magnetizable material, or conversely the first magnet 32 has magnetizable material and the second magnet 34 has magnetic material. The two magnets 32, 34 are oriented with respect to one another in such a way that they generate a mutually attracting magnetic force. The thus generated attraction force ensures that the valve element 26 is held in the closed first position according to FIG. 2a, and thus forms a closing force. In the normal operating state, the valve element 26 has only to withstand loads from gusty winds and, in the case of using a film cushion 2, as illustrated in FIG. 1, also to withstand the air pressure prevailing in the cavity 12 of the film cushion 2.

In certain, generally undesired situations, which will be discussed in more detail below, water, in particular rainwater, collects on the upper side of at least one of the two film layers 4 or 6, generally at first on the upper side of the upper film 4 according to FIG. 1. The same also applies to the case when using a single-layer film roofing system or film façade system in which, by contrast to the film cushion illustrated in FIG. 1, only the film layer 4 is used as single film layer. This state is schematically illustrated in FIG. 2a, in which water 40 collected on the upper side of film layer 4 or 6 and valve element 26 is schematically depicted at a distance, with the arrow 40a symbolizing the water column with which the water 40 presses onto the film layer 4 or 6 and the valve element 26. Consequently, the valve element 26 is charged with the load from the water column 40a. The water column 40a can be held up to a defined height above the valve element 26. The attraction force of the two magnets 32, 34 is rated in such a way that the valve element 26 is held in the closed first position if and as long as the valve element 26 is charged with a pressure, corresponding to the height of the water column 40a, which is less than a predetermined threshold value or at most equal to the threshold value. Of course, the attraction force and thus the closing force can be varied via the strength of the magnets 32, 34.

Figure 2B:
Figure 2B:
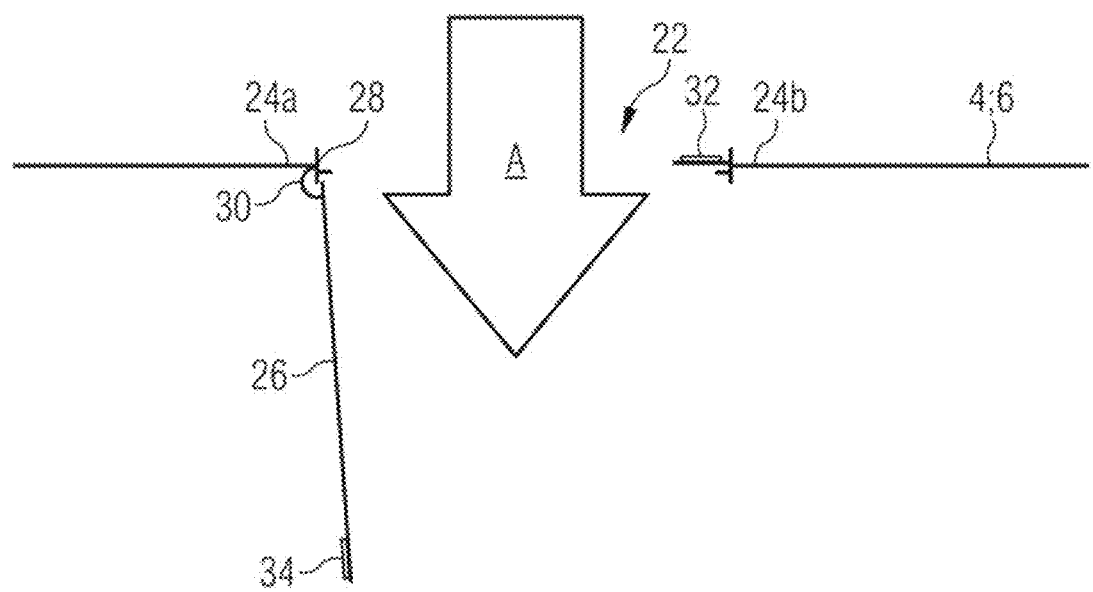

With a further increase of the water 40, the water column 40a rises. If it exceeds a defined height which corresponds to the aforementioned defined threshold value, the attraction force of the magnets 32, 34 is overcome, with the result that the valve element 26 opens against the spring force of the spring 30 in the direction of the arrow A into the opened second position. For this purpose, the valve element 26 swings downward, with the result that the opened second position lies below the closed first position, as can be seen in FIG. 2b. The pivoting movement of the valve element 26 into the lower open second position is accordingly brought about by the water pressure. As can be seen in FIG. 2b, the valve element 26, in its opened second position, frees the substantially complete cross section of the opening 22 in the film layer 4 or 6, with the result that the opening 22 is substantially completely exposed. This results in the water 40 being able to flow in the direction of the arrow A with a high flow rate and thus quickly through the opening 22 and thus being able to be drained.

After the water has been substantially completely drained, the valve element 26 is no longer charged by a water pressure. Accordingly, there is then no water pressure to counteract the valve element 26 being pivoted back from an opened second position into the closed first position. Rather, all that is required for this pivoting movement is for the weight of the valve element 26 to be overcome. As has already been discussed above, the spring force of the spring 30 is accordingly rated such that it counteracts substantially only the weight of the valve element 26 and thus the action of gravitational force on the valve element 26 in order to pivot it from the open second position in the direction of the closed first position, this being indicated in FIG. 2c by the arrow B. Consequently, the spring force of the spring 30 is relatively small such that it cannot prevent opening of the valve element 26 and thus a pivoting movement into the opened second position according to FIG. 2b on account of the water pressure, but is at it were overridden by the water pressure.

Figure 2C:
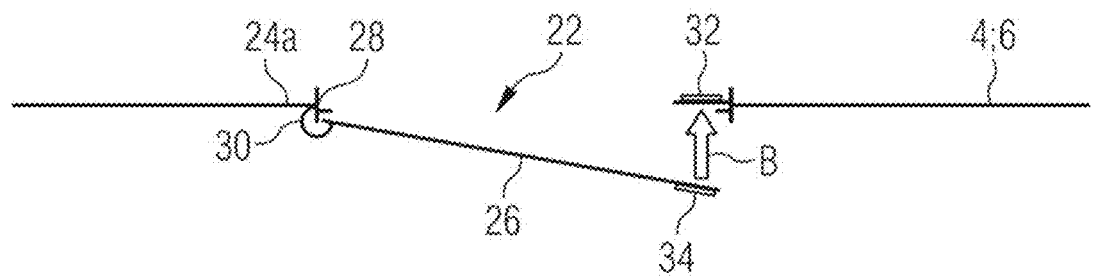

FIG. 2c now illustrates the valve element 26 in a pivoted position during the pivoting movement from the opened second position in the direction of the closed first position. When the valve element 26 approaches the closed first position during this pivoting movement caused by the spring 30, the distance between the two magnets 32, 34 thus necessarily also becomes ever smaller. This results in the distance between the two magnets 32, 34 falling below a predetermined maximum value such that the attraction force between the two magnets 32, 34 then begins to act and takes over the remainder of the pivoting movement of the valve element 26 into the closed first position. Consequently, the pivoting-back movement of the valve element 26 from the opened second position into the closed first position is brought about first of all by the spring force of the spring 30 and then by the attraction force between the two magnets 32, 34.

Figure 2D:
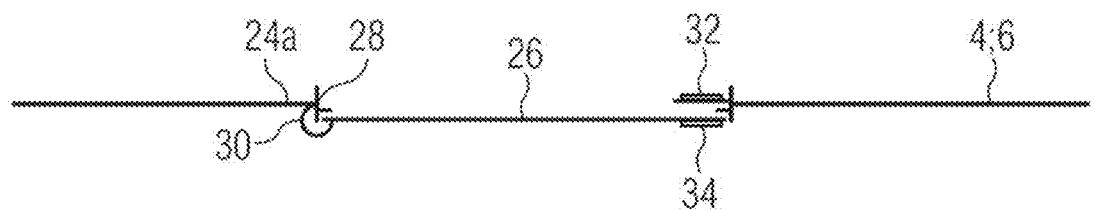

FIG. 2d shows the valve element 26 again in the closed first position, with now the film layer 4 or 6 being freed from water and thus, in this normal operating state, neither the film layer 4 or 6 nor the valve element 26 being charged with water pressure.

FIGS. 3 to 6 illustrate by way of example different scenarios for the film cushion 2 shown in FIG. 1, in which scenarios the use of the valves 20a, 20b plays a role.

Figure 3A:
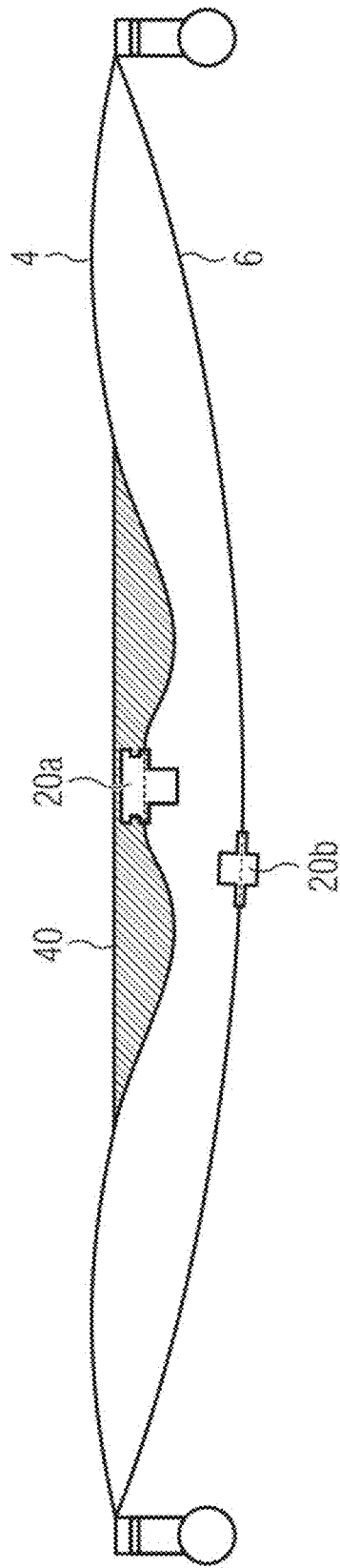
Figure 3B:
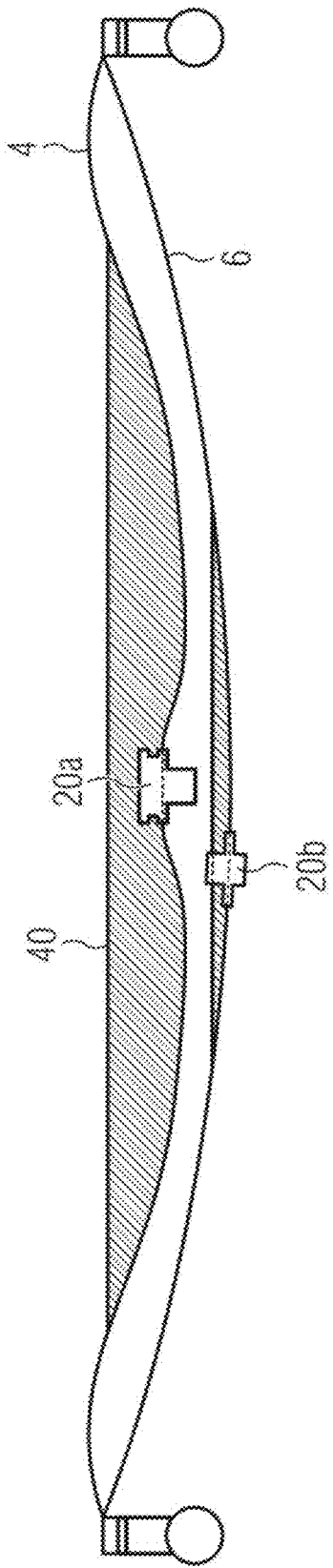

FIG. 3 illustrates a scenario in which the upper film layer 4 partially collapses. This state is as a rule a result of small leaks or disturbances in the compressed-air supply. Here, strong wind loads ensure that the upper film layer 4 partially collapses and water 40 collects there, as can be seen in FIG. 3a. In this state, the two valves 20a, 20b are still closed. Whereas FIG. 3a shows a state in which the upper film layer 4 first begins to collapse and water 40 has already formed on the upper side of the upper film layer 4, FIG. 3b shows an advanced state in which the upper film layer 4 has now collapsed more pronouncedly and further water 40 has formed on the upper film layer 4. This causes the upper valve 20a to open, with the result that the water 40 is drained to the lower film layer 6. It is thus the case that not only the lower film layer 6 but also the lower valve 20b arranged there are charged with increasing water pressure. This in turn also causes the lower valve 20b to open and thus the water 40 to drain to the outside until the collapsed film cushion 2 is substantially completely freed from water.

Depending on the requirement, the two valves 20a, 20b can be selectively set to identical or different threshold values at which the attraction force of the magnets 32, 34 is overcome and the valve element 26 is pivoted from the upper closed first position into the lower opened second position (cf. in this respect FIG. 2), with it being possible moreover in principle for this to apply to all scenarios and embodiments and thus also to the further scenarios described below with reference to FIGS. 4 to 6.

Figure 4A:
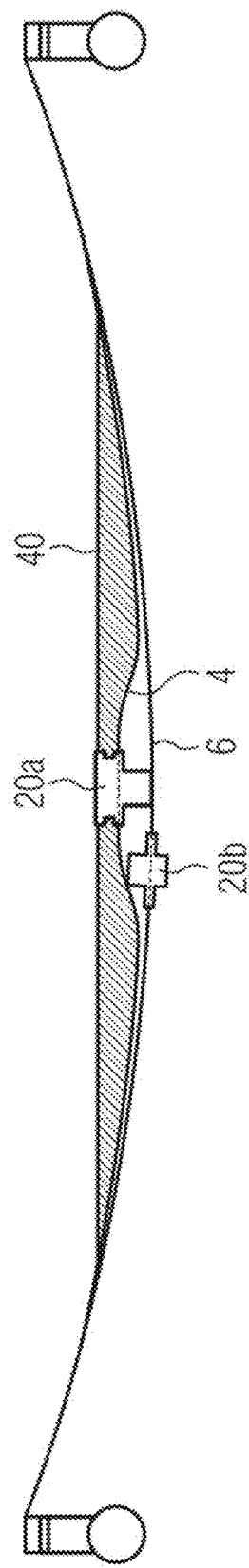
Figure 4B:
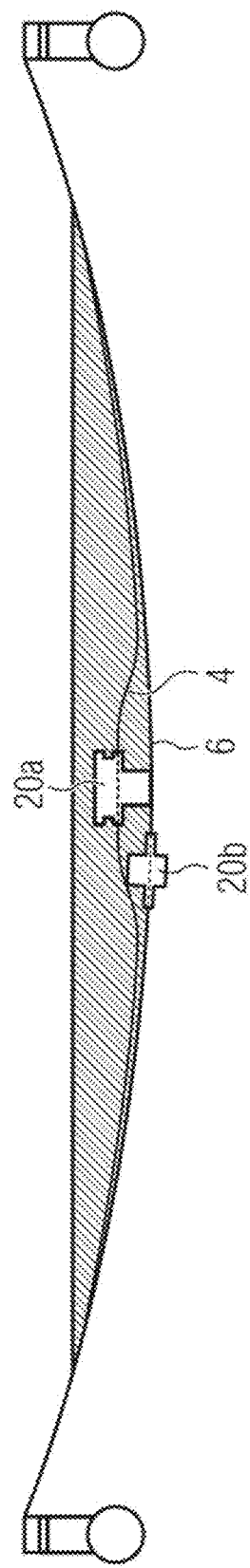

FIG. 4 shows a scenario in which the upper film layer 4 is substantially completely collapsed, to be precise as a result of a substantially complete pressure loss and possibly under additional influence of strong wind loads. Here, FIG. 4a shows a state in which, although the upper film layer 4 has already completely collapsed and therefore water 40 has already formed on the upper film layer 4, both valves 20a, 20b are still closed. FIG. 4b shows an advanced state in which further water 40 has collected on the completely collapsed upper film layer 4 and, as a result of the thus increased water pressure, not only the upper valve 20a but also at the same time the lower valve 20b open since, by way of the collapsed upper film layer 4, the water pressure then likewise acts with similar or equal strength on the lower valve 20b.

Figure 5A:
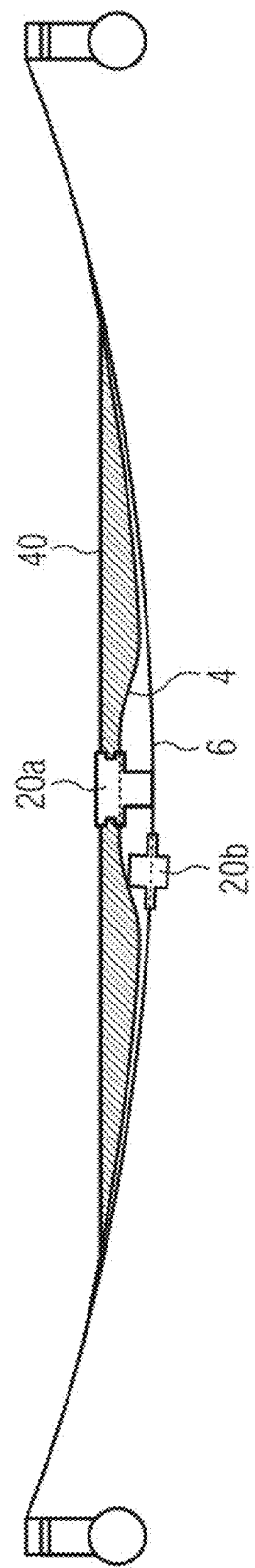
Figure 5B:
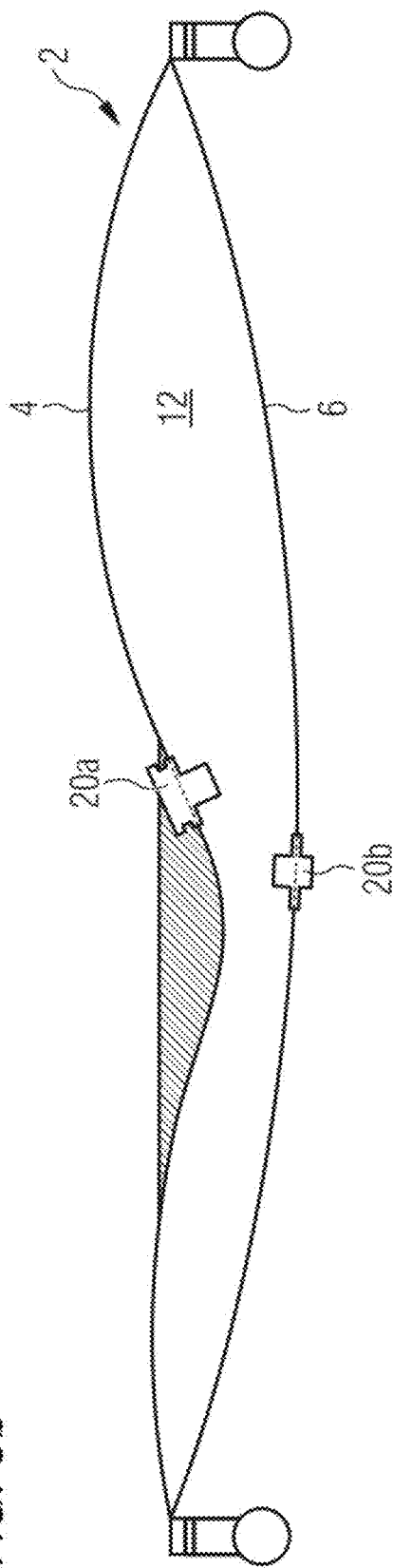

FIG. 5 shows by way of example, on the basis of two states, the restoration of the originally collapsed film cushion by blowing in fresh compressed air and thereby induced return of the upper film layer 4 from the collapsed lower position into the upper normal operation position, in which the upper film layer 4 then again assumes the upwardly curved shape depicted in FIG. 1. For this purpose, FIG. 5a depicts a first state in which, although the upper film layer 4 is still substantially completely collapsed, there is still relatively little water 40 on the upper film layer 4, with the result that both valves 20a, 20b are now closed again and compressed air begins to be blown into the film cushion. FIG. 5b shows an advanced state in which, in order to straighten up the upper film layer 4, further compressed air has already been blown into the film cushion 2 and of course the valves 20a, 20b continue to be closed. Although, during this restoration process, there at first still remains a small trough-shaped portion in the upper film layer 4 in which residual water 40 has collected, said trough-shaped portion disappears with increasing inflation of the film cushion 2, whereby the still remaining residual water 40 runs off to the side.

Finally, FIG. 6 also shows a further scenario in which the upper film layer 4 tears on account of very high wind loads, with the result that the lower film layer 6 is exposed upwardly and outwardly like a trough. The torn upper film layer 4 can then no longer keep out or accommodate rainwater; rather, the water 40 passes directly onto the upper side of the lower film layer 6 and collects there. The torn state of the upper film layer 4 renders the upper valve 20a ineffective. FIG. 6a shows a first state in which the upper film layer 4 is already torn, with the upper valve 20a having become ineffective as a result, and water 40 has already accumulated on the lower film layer 6, but the lower valve 20b is still closed on account of still insufficient water pressure. FIG. 6b shows an advanced state in which further water 40 has accumulated on the lower film layer 6 and the increasing water pressure has now caused the lower valve 20b to open in order for the water 40 to be drained downward by means of gravitational force.

The invention claimed is:

1. A building cladding element comprising:
 a film cushion comprising at least an upper film layer and a lower film layer, wherein between the upper film layer and the lower film layer at least one substantially fluid-tightly closed cavity is formed which is configured to contain a fluid medium, wherein the fluid medium in the cavity can be charged with a pressure;
 an upper first valve provided in the upper film layer, the upper first valve comprising:
  a first valve element arranged in a region of a first opening in the upper film layer, wherein the first valve element is pivotable between a first position in which the first valve element closes the first opening and a second position in which the first valve element at least partially frees the first opening, and
  first opening and closing means mounted on the upper film layer and configured to hold the first valve element in the first position as long as pressure, configured to act on the first valve element, of a liquid come onto an upper side of the upper film layer is less than a predetermined first threshold value or at most equal to the first threshold value, and configured to allow a pivoting movement of the first valve element from the first position into the second position if the pressure of the liquid acting on the first valve element exceeds the first threshold value, and configured to pivot the first valve element from the second position into the first position after the pressure of the liquid acting on the first valve element is substantially no longer present; and
 a lower second valve provided in the lower film layer, the lower second valve comprising:
  a second valve element arranged in a region of a second opening in the lower film layer, wherein the second valve element is pivotable between a first position in which the second valve element closes the second opening and a second position in which the second valve element at least partially frees the second opening, and
  second opening and closing means mounted on the lower film layer and configured to hold the second valve element in the first position as long as the pressure, configured to act on the second valve element, of the liquid come onto an upper side of the lower film layer is less than a predetermined second threshold value or at most equal to the second threshold value, and configured to allow a pivoting movement of the second valve element from the first position into the second position if the pressure of the liquid acting on the second valve element exceeds the second threshold value, and configured to pivot the second valve element from the second position into the first position after the pressure of the liquid acting on the second valve element is substantially no longer present,
wherein the upper first valve operates autonomously and independently of the lower second valve.

2. The building cladding element of claim 1, wherein the first valve element is a flexible or elastic tab which is fastened by one end of the first valve element to the upper film layer and is movable by an other end of the first valve element with respect to the opening.

3. The building cladding element of claim 2, wherein the first valve element is produced at least in certain portions from film material.

4. The building cladding element of claim 1, wherein the first valve element is a flap which is pivotable by one end of the first valve element about a hinge, which can be mounted in a substantially positionally fixed manner with respect to the upper film layer, and is movable by an other end of the first valve element with respect to the opening.

5. The building cladding element of claim 4, wherein the flap forms a substantially rigid element.

6. The building cladding element of claim 1, wherein the first opening and closing means have restoring means which generate a restoring force in order to pivot the first valve element from the second position in the direction of the first position.

7. The building cladding element of claim 6, wherein the restoring means have spring means which generate a spring force as restoring force.

8. The building cladding element of claim 7, wherein the spring means have at least one spiral spring arranged in a region of a hinge or on the hinge.

9. The building cladding element of claim 7, wherein the restoring force is rated so as substantially to counteract only the weight of the first valve element in order to pivot the first valve element from the second position in the direction of the first position.

10. The building cladding element of claim 6, wherein the restoring force is rated in such a way so as to hold the first valve element in the first position as long as the pressure of the liquid acting on the first valve element is less than the first threshold value or at most equal to the first threshold value.

11. The building cladding element of claim 1, wherein the first opening and closing means have a first magnet element which can be mounted on and/or in the upper film layer, and a second magnet element which is provided on and/or in the first valve element, wherein the two magnet elements are oriented with respect to one another in such a way that an attraction force acting on the two magnet elements is generated.

12. The building cladding element of claim 11, wherein the attraction force is rated so as to bring the first valve element into the first position and to hold the first valve element in the first position if and as long as the pressure of the liquid acting on the first valve element is less than the first threshold value or at most equal to the first threshold value.

13. The building cladding element of claim 11, wherein the attraction force is rated so as to bring the first valve element into the first position if the distance between the two magnet elements falls below a predetermined maximum value.

14. The building cladding element of claim 11, wherein the first magnet element has magnetic material and the second magnet element has magnetizable material, or the first magnet element has magnetizable material and the second magnet element has magnetic material, or both magnet elements have magnetic material.

15. The building cladding element of claim 11, wherein the second magnet element is provided on the first valve element in a region of an end or adjacent to the end.

16. The building cladding element of claim 1, wherein the lower second valve is offset from the upper first valve.

* * * * *